March 1, 1966  V. F. ANDERSON  3,237,816
MEASURING DISPENSER

Filed Nov. 23, 1964  3 Sheets-Sheet 1

INVENTOR:
VICTOR F. ANDERSON
BY: Kenneth Hoocke
HIS AGENT

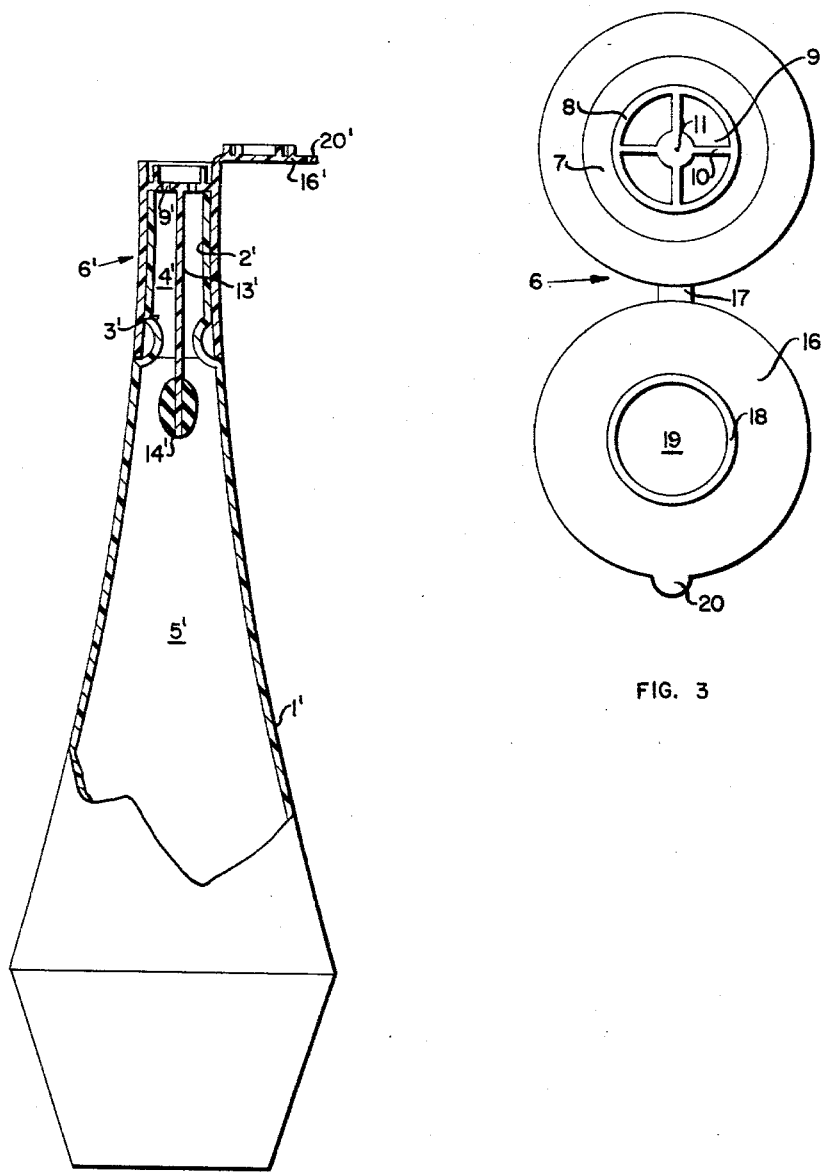

March 1, 1966 V. F. ANDERSON 3,237,816
MEASURING DISPENSER

Filed Nov. 23, 1964 3 Sheets-Sheet 3

INVENTOR:
VICTOR F. ANDERSON
BY:
HIS AGENT

United States Patent Office 3,237,816
Patented Mar. 1, 1966

3,237,816
MEASURING DISPENSER
Victor F. Anderson, Wenonah, N.J., assignor to Shell Oil Company, New York, N.Y., a corporation of Delaware
Filed Nov. 23, 1964, Ser. No. 412,970
5 Claims. (Cl. 222—450)

This invention relates to a device for dispensing liquid or granular material from a container and more particularly to a closure for such container which is adapted to permit dispensing a predetermined quantity of material from the container.

In the dispensing of products such as detergents, medicines and the like, it is often desirable to provide a common measure such as a teaspoonful of a particular liquid or powder. The great majority of liquid products sold on the market today are packaged in containers possessing a plastic spout with a plastic cap secured thereto, such as by threads to seal the container. This is particularly true of products such as the detergents sold in liquid form. It is common practice for the user to utilize the container cap as an instrument of measure. For example, if the housewife wants to do the dishes, she unscrews the cap from the spout of the container and pours the amount of detergent she considers necessary to do the job into the cap. She then empties the liquid in the cap into the dishwater and replaces the cap on the container spout.

Such a method is time-consuming because the cap must be removed, the liquid measured, poured out the cap, and the cap replaced on the container spout. Such an arrangement is also messy in that it is hard to judge when the cap is full of liquid and the liquid sometimes spills over onto the user's hand. It can readily be seen that such a method of measuring can also be wasteful since the spilled liquid may not be necessary to do the job at hand, or in the case of medicinal products may lead to harmful overdosages.

Further, in the case of detergents, after a period of use the cap becomes coated with a gummy film, making it hard to handle and difficult to thread on and off the spout.

It is the principal object of this invention to provide a measuring means in a container, eliminating thereby many such undesirable features of present methods of measuring and obviating the use of the cap for measuring and dispensing.

Broadly, the invention comprises a novel container closure means provided with a stopper member which is operable to selectively seal off a predetermined portion of a spout in the container such that a measured quantity of product may be dispensed therefrom.

The invention will now be described with reference to the accompanying drawings wherein:

FIGURE 3 is a plan view of the closure, showing the lid portion thereof in open position;

FIGURE 4 is partly an elevation and partly a longitudinal section of a modified embodiment of the invention;

Figure 2:
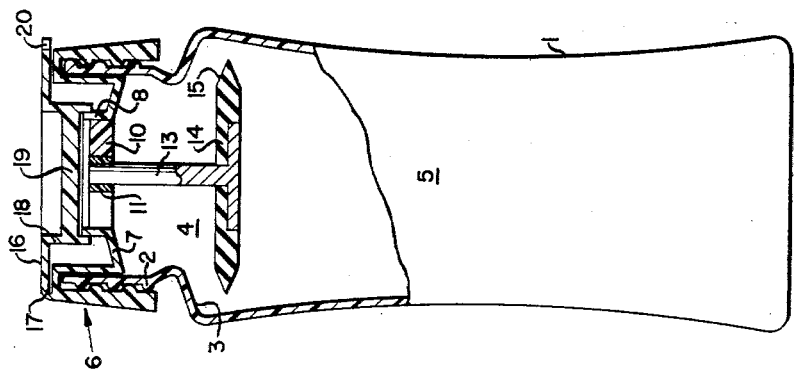
FIGURE 2 is a longitudinal section of a container and closure as in FIGURE 1 wherein the closure is shown in a different position.
Figure 1:
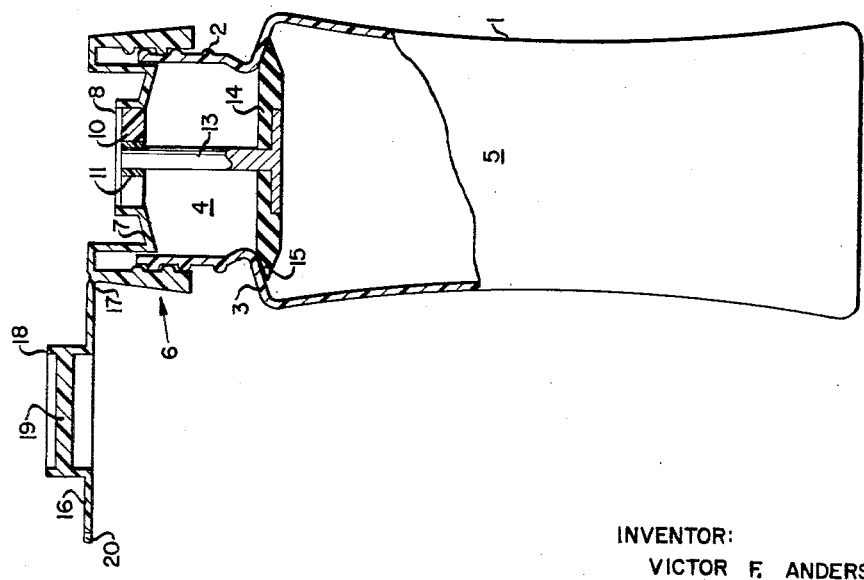
FIGURE 1 is a longitudinal section of a container provided with a closure according to the invention.

Referring now to FIGURES 1 to 3, there is shown a generally cylindrical container 1 which has a reduced-diameter threaded neck or spout 2 having an external helical thread. The container is preferably formed of plastic material but any suitable material such as glass, metal, etc., may be used. The spout 2 terminates at its upper end in a discharge outlet so that material may be dispensed from the container 1. An inwardly protruding circumferential seating shoulder 3 is formed inside said container 1 at a point somewhat below the discharge outlet such as the base of the spout 2. The shoulder 3 defines a first or measuring compartment 4 located above said shoulder and separates it from the main or second compartment 5 located below said shoulder.

A closure means generally denoted at 6 is provided for frictionally engaging the spout 2 to seal off the discharge outlet located at the upper end of said spout. As shown, the closure 6 includes an outer, internally threaded ring to engage the external threads on the spout member 2 but it is to be understood that any conventional type of frictional connection which would provide the necessary seal and permit up and down motion of the closure may be utilized.

As best shown in FIGURES 1 and 3, the closure 6 is provided with a radially inwardly extending portion 7 which terminates in an upwardly extending annular flange 8, the latter defines a circular opening which is separated into quadrants 9 by radial web members 10. The web member terminate in a hub 11 located in the center of said opening. A shank member 13 is fixed to and extends downwardly from said hub 11 and terminates in a generally circular disk-shaped stopper 14. The stopper 14 is made of a resilient plastic or rubbery material which is fixedly secured to the lower end of the shank 13.

As shown in FIGURES 1 and 2 the edge 15 of the stopper 14 is beveled to engage a portion of the shoulder 3 in sealing relation to prevent material from passing between the compartments 4 and 5 when in the raised position. The shapes of the shoulder 3 and the edge 15 of the stopper need not necessarily be as shown, but rather can take any suitable shape desired so long as they cooperate to effectively seal off the compartments 4 and 5. It should be noted that in the preferred method of manufacture, the container 1 is first molded or otherwise fabricated as a finished unit and then filled with a given liquid or powdery product. Then the closure 6 is screwed down on the spout 2 and the edge 15 of the resilient sotpper 14 is forced past the shoulder 3 of the container 1. This is possible because the edge 15 of the stopper is beveled on both sides to provide the proper lead-in angle past shoulder 3 and still permit effective sealing (see FIGURE 1) against the lower side of shoulder 3 when the container 1 is in use. As shown in FIGURE 2, the stopper means 14 is completely out of engagement with the shoulder 3 when the closure means 6 is completely screwed or otherwise fully moved down in engagement with the spout or neck portion 2 of the container 1.

The integral closure 6 is further advantageously provided with a flip-open lid 16 which is hinged to the main body of the closure means 6 as at 17. The hinge 17 is preferably formed of a thin plastic flap as best shown in FIGURE 3. However, any suitable form of conventional hinge may be employed. The lid 16 is formed with a protruding annular ring 18 having a transverse wall 19 extending fully across the ring and recessed therein from the top as shown in FIGURE 1. When the lid 16 is in the closed position as shown in FIGURE 2, the ring 18 sealingly engages the outer periphery of the end of the annular flange 8, and the wall member 19 prevents material from passing through the quadrant shaped openings 9 defined by the web members 10. To facilitate opening of the lid member 16, a protruding tab member 20 is formed on the outer periphery of the lid 16 opposite the hinged connection 17.

The operation of the device to provide a specific measured quantity of material will now be described. With the closure 6 completely seated upon the spout member 2 as shown in FIGURE 2, the container 1 is tilted downwardly so that material may freely pass from the compartment 5 into the compartment 4. This passage of material is possible since the stopper member 14 is completely out of engagement with the shoulder 3. While the container 1 is maintained in a tilted or semi-inverted position, the closure means 6 is unscrewed from the spout 2 and the beveled edge 15 of the stopper 14 is drawn into sealing engagement with the shoulder 3 thereby preventing material passage from the compartment 5 into the compartment 4. With the measured amount of material now entrapped in the compartment 4 the tab member 20 may be operated to release the hinged lid 16 as shown in FIGURE 1, thus allowing the measured quantity of material to pass (when the container 1 is inverted) through the quadrant openings 9 of the closure member 6 for the desired use.

The embodiment shown in FIGURE 4 is very similar to that shown in the aforementioned FIGURES 1 to 3 with the exception of minor variations in the construction of the closure member 6'. In this particular embodiment the stopper member 14' has been formed in the shape of an ellipsoid whose major axis coincides with the longitudinal axis of the shank member 13' as shown. In this embodiment the ellipsoid shaped stopper member 14' is preferably constructed of a highly resilient material such as soft rubber, etc. The use of such a material results in a very efficient sealing engagement between the stopper 14' and the shoulder 3' without the somewhat closer tolerances required of the stopper construction shown in FIGURES 1 and 2.

The closure member 6' of FIGURE 4 further differs from that shown in FIGURES 1 to 3 in that a pure frictional sealing engagement is used between the container spout 2' and the closure member to permit relative axial sliding. Thus, in operation, the closure 6' (with the lid member 16' closed) is pushed downwardly upon the container spout 2' to its lowest position. The container 1' is then inverted so that material may freely pass from the compartment 5' into the compartment 4'. This passage of material is possible since the stopper member 14' is completely out of engagement with the shoulder 3'. While the container 1' is maintained in an inverted position, the closure 6' is pulled outwardly from the spout 2' and the resilient ellipsoid stopper member 14' is drawn into sealing engagement with the shoulder 3' thereby preventing material passage between the compartments 4' and 5'. With the measured amount of material now entrapped in the compartment 4', the tab member 20' is pulled to release the hinged lid 16', and when the container 1' is inverted the measured quantity of material drains through the openings 9' for the desired use.

Figure 5:
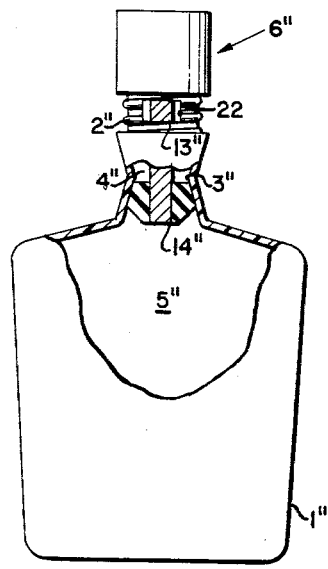
FIGURE 5 is partly an elevation and partly a longitudinal section of another modified embodiment of the invention; and, FIGURE 6 shows the embodiment of FIGURE 5 with the closure in a different position.
Figure 6:
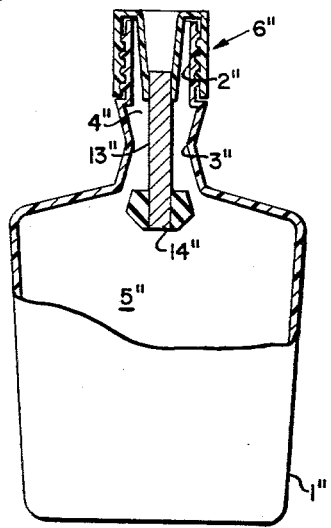

FIGURES 5 and 6 show a further modification of the invention wherein the discharge outlet comprises a window or orifice 22 located in the side of the externally threaded spout 2" of the container 1". This construction has the advantage of eliminating the necessity of a hinged lid on the closure means 6". As in the previously described containers, the stopper 14" is shaped so as to engage the inwardly directed shoulder 3" of the container spout 2" sealingly when the closure member 6" is unscrewed to its outermost position as shown in FIGURE 5. The outer ring of the closure 6" includes a skirt of sufficient length to cover the window 22 when it is screwed down as appears in FIGURE 6. In this construction the stopper 14" is advantageously manufactured of a highly resilient material because the compartment 4" should be sealed substantially simultaneously with the opening of the outlet orifice 22 in order for the device to function properly. In this manner, the closure means 6" may then be unthreaded a slightly further amount after the compartment 4" has been sealed off to fully open the orifice 22 as shown in FIGURE 5.

In operation, the closure member 6" is threaded completely down upon the spout 2" (see FIGURE 6) and the container is then inverted to allow material to pass from the compartment 5" into the compartment 4". The closure member 6" is then unthreaded from the spout 2" and the stopper 14" is drawn into sealing engagement with the shoulder member 13" while the container is maintained in inverted position. At substantially the same time the window 22 is exposed to allow the measured quantity of material, now trapped within the compartment 4", to pass therethrough.

It may be noted that closure of the stopper 14" on its shoulder 3" simultaneously with opening of the window 22 is not essential, provided the closure 6" is moved rapidly, as by providing threads with a steep pitch. Only a small amount of material will then flow from the compartment 5" into compartment 4" after uncovering the window 22 and before closure of the stopper 14". It may be observed that precise measurement is then impossible, but that measuring is effected with sufficient accuracy for many purposes.

I claim as my invention:

1. A device for metering liquids and granular materials comprising:
   (a) a container provided with a discharge outlet and enclosing a main compartment;
   (b) a circuferential shoulder formed inside said container at a location below said discharge outlet, said container including above said shoulder a wall structure defining a measuring compartment above said shoulder which is separated by said shoulder from the main compartment of the container;
   (c) a closure which is axially movable relatively to and in frictional screw-threaded engagement with the top of said container;
   (d) means on said closure for selectively allowing material passage from the measuring compartment through said discharge outlet and closing said outlet;
   (e) a shank member secured to said closure and extending axially therefrom into said container; and,
   (f) disc-shaped stopper means secured to said shank member remotely from said closure and below the circumferential shoulder inside said container;
   (g) said stopper means being positioned on said shank member and having dimensions adapted to engage said shoulder sealingly in one position of the closure for preventing passage of material between said compartments and to be free from said shoulder in another position of the closure.

2. A device as set forth in claim 1 wherein said stopper means has a center portion which is substantially rigid and at least the edge portions being made of a resilient material.

3. A device as set forth in claim 1 wherein said closure means is threaded for threadably engaging a neck portion at the top of said container.

4. A device as set forth in claim 1 wherein the means of step *d* comprises a hinged cover.

5. A device as set forth in claim 1 wherein said container has a threaded neck portion at its top for threadably engaging said closure; said discharge outlet is located in the side of said neck portion; and said closure is axially movable for assuming a first position preventing material passage through said discharge outlet, and a second position wherein said discharge outlet is opened for material passage therethrough substantially simultaneously with said sealing engagement of said stopper with said shoulder means.

References Cited by the Examiner

UNITED STATES PATENTS

| | | | |
|---|---|---|---|
| 2,183,912 | 12/1939 | Isler | 222—497 |
| 3,059,816 | 10/1962 | Goldstein | 222—543 X |
| 3,134,514 | 5/1964 | Booth | 222—496 X |

LOUIS J. DEMBO, *Primary Examiner.*

HADD S. LANE, *Examiner.*